US010035410B2

United States Patent
Taketomo et al.

(10) Patent No.: US 10,035,410 B2
(45) Date of Patent: Jul. 31, 2018

(54) PARTING SEAL AND SEALING STRUCTURE OF PARTING PORTION

(71) Applicant: NISHIKAWA RUBBER CO., LTD., Hiroshima-shi, Hiroshima-ken (JP)

(72) Inventors: Shinsuke Taketomo, Hiroshima (JP); Hirofumi Ogawa, Hiroshima (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 15 days.

(21) Appl. No.: 15/384,983

(22) Filed: Dec. 20, 2016

(65) Prior Publication Data

US 2017/0182871 A1    Jun. 29, 2017

(30) Foreign Application Priority Data

Dec. 28, 2015  (JP) .................. 2015-256503

(51) Int. Cl.
*B60J 10/24* (2016.01)
*B60J 10/26* (2016.01)
*B60J 5/04* (2006.01)
*B60J 10/25* (2016.01)

(52) U.S. Cl.
CPC ............ *B60J 10/24* (2016.02); *B60J 5/04* (2013.01); *B60J 5/047* (2013.01); *B60J 5/0493* (2013.01); *B60J 10/25* (2016.02); *B60J 10/26* (2016.02)

(58) Field of Classification Search
CPC ......... B60J 5/0479; B60J 5/0493; B60J 10/26
See application file for complete search history.

(56) References Cited

U.S. PATENT DOCUMENTS

| 3,883,993 A | * | 5/1975 | Pullan | B60J 10/24 49/490.1 |
| 4,492,405 A | * | 1/1985 | Chikaraishi | B60J 5/06 296/146.9 |
| 4,603,899 A | * | 8/1986 | Iwasa | B60J 10/24 296/154 |
| 5,307,591 A | * | 5/1994 | Usuta | B60J 10/24 49/475.1 |

(Continued)

FOREIGN PATENT DOCUMENTS

JP  H05-270261 A  10/1993
JP  4490159 B2 *  6/2010

(Continued)

*Primary Examiner* — Katherine W Mitchell
*Assistant Examiner* — Catherine A Kelly
(74) *Attorney, Agent, or Firm* — Robert P. Michal, Esq.; Carter, DeLuca, Farrell & Schmidt, LLP

(57) ABSTRACT

A parting seal includes: an assembly part; and a seal part. The assembly part is assembled on a rear door. The seal part is integrally molded with the assembly part and closes a parting portion between a front door and the rear door. The seal part is hollow and includes: a first hollow wall which faces the parting portion; and a second hollow wall which faces a body panel. A lip is formed on a position on which the first hollow wall and the second hollow wall come into contact with each other on a side of the front door. The lip protrudes toward an outer-cabin side. The first hollow wall and the lip are made of sponge material, the second hollow wall and the assembly part are made of solid material. The assembly part is free of a core, and is immovably assembled on the rear door.

13 Claims, 5 Drawing Sheets

(56) References Cited

U.S. PATENT DOCUMENTS

| | | | | |
|---|---|---|---|---|
| 5,376,319 A * | 12/1994 | Arima | ............... | B29C 47/0028 156/244.13 |
| 6,487,819 B1 * | 12/2002 | Goldberg | ............... | B60J 10/24 49/475.1 |
| 6,880,293 B2 * | 4/2005 | Ishikawa | ............... | B60J 1/17 49/414 |
| 7,048,328 B2 * | 5/2006 | Tamura | ............... | B60J 10/24 296/216.09 |
| 7,059,611 B2 * | 6/2006 | Ahlers | ............... | B60J 10/24 277/628 |
| 7,841,636 B2 * | 11/2010 | Huth | ............... | B60R 13/06 296/1.08 |
| 8,333,427 B2 * | 12/2012 | Sawada | ............... | B60J 7/022 296/216.08 |
| 8,522,481 B2 * | 9/2013 | Brancaleone | ............... | B60J 10/24 296/146.2 |
| 8,720,973 B2 * | 5/2014 | Sitterlet | ............... | B60J 10/235 296/146.15 |
| 8,882,186 B2 * | 11/2014 | Matsumoto | ............... | B60J 10/081 296/146.9 |
| 9,415,670 B2 * | 8/2016 | Masumoto | ............... | B60J 10/24 |
| 2003/0107244 A1 * | 6/2003 | Tamura | ............... | B60J 10/24 296/216.09 |
| 2005/0064135 A1 * | 3/2005 | Perrin | ............... | B60J 10/24 428/122 |
| 2006/0000148 A1 * | 1/2006 | Mugishima | ............... | B60J 10/24 49/475.1 |
| 2009/0001772 A1 * | 1/2009 | Dosaki | ............... | B60J 10/24 296/216.09 |
| 2013/0160375 A1 * | 6/2013 | Kuwabara | ............... | E06B 7/2303 49/490.1 |
| 2015/0076856 A1 * | 3/2015 | Masumoto | ............... | B60J 10/24 296/146.9 |

FOREIGN PATENT DOCUMENTS

| | | |
|---|---|---|
| JP | 4490159 B2 | 6/2010 |
| JP | 2014-177266 A | 9/2014 |

* cited by examiner

PARTING SEAL AND SEALING STRUCTURE OF PARTING PORTION

CROSS REFERENCE TO RELATED APPLICATION

This application claims the benefit under 35 U.S.C. § 119 of JP Patent Application JP 2015-256503 filed Dec. 28, 2015, the entire disclosure of which is incorporated herein by reference.

BACKGROUND INFORMATION

The present invention relates to parting seals and sealing structures of parting portions. Seal parts of the parting seals close the parting portions between rear ends of front doors and front ends of rear doors. The seal parts are integrally molded with assembly parts which are assembled on the rear doors of four-door sedans or the like.

As shown in FIG. 6 to FIG. 9, sealing structures from an inner-cabin side for closing and sealing a parting portion between a rear end of a front door 2 and a front end of a rear door 1 of four-door sedans or the like have been disclosed. The sealing structures aim at preventing entrance of air and resultant noise caused by the air and improving appearance (see, for example, Japanese unexamined Patent Publication No. 2014-177266).

The Japanese unexamined Patent Publication No. 2014-177266 discloses that a seal lip 40 has a substantially tongue-shaped cross section and closes the parting portion. A bending point 200 is provided on a base root 41b side of the seal lip 40 so that, when high pressure water 700 splashes the seal lip 40 while spraying water for washing automobiles or the like, the seal lip 40 is curved toward the inner-cabin side and a top end 41a of the seal lip 40 makes elastic contact with a center pillar 4 as a body panel. With this configuration, a direction of high pressure water 700, which splashes the parting portion from an outer-cabin side is forcibly re-directed at a desired angle with respect to the direction of high pressure water 700 when high pressure water 700 splashes the seal lip 40. This configuration prevents high pressure water 700 from directly hitting a front side weather strip 20, operatively coupled on the front door 2, and performs the above-mentioned effects. The seal lip 40 is disposed at an upper part of a front end of a rear side weather strip 10, which is operatively coupled on a peripheral edge of the rear door 1, and extends downward.

A top end 41a of the seal lip 40 may: smoothly extend from a base root 41b and taper off as shown in FIG. 8; or be bent toward an outer-cabin side as shown in FIG. 9.

With this configuration, the seal lip 40 makes elastic contact with the center pillar 4 and stably guides high pressure water 700 in a fixed direction, in which the front side weather strip 20 is not directly hit by high pressure water 700, without fluttering in an outer and inner cabin side direction like a flexible plate. This configuration prevents high pressure water 700 from entering the inner-cabin side from the space between the front side weather strip 20 and the center pillar 4, thereby preventing water leak.

Unfortunately, however, the above-described configuration requires that the seal lip 40 be curved toward the inner-cabin side and make elastic contact with the center pillar 4, when high pressure water 700 splashes the seal lip 40. That is, when a distance is long between a surface of the center pillar 4 and a surface of the rear door 1 or the front door 2, the above-described sealing structure is not adaptable for the following reasons. The seal lip 40, with a size sufficient for closing the parting portion from the inner-cabin side, has to be longer and larger for making elastic contact with the center pillar 4. The resultant seal lip 40, which is longer and larger in size, has a harmful influence on opening and closing the door and makes the noise by the air even worse.

Also, closing the parting portions by means of hollow seal parts, not the seal lip 40 having the substantially tongue-shaped cross section, has been known (see, for example, Japanese unexamined Patent Publication No. H05-270261). This configuration also requires that the hollow seal parts make elastic contact with the center pillars. Accordingly, when the distance is long between the surface of the door and the surface of the center pillar 4, this configuration is not adaptable.

In the Japanese unexamined Patent Publication No. H05-270261, weather strips are operatively coupled on automobile bodies which do not move, not on the doors which move. In such a case, it is preferable that the weather strips are firmly fixed without shifting. Accordingly, cores in the weather strips are extended to top ends of the hollow seal parts. But the weather strips with the cores increase weight and costs.

Other sealing structures have been disclosed, which are adaptable even in case the distance is long between the surface of the door and the surface of the body panel, in which the hollow seal parts close the parting portions, and the hollow seal parts do not make elastic contact with the body panels when high pressure water 700 splashes the hollow seal parts (see, for example, Japanese examined Patent Publication No. 4490159).

Unfortunately, however, in the Japanese examined Patent Publication No. 4490159, an installation base member is molded by bending, and the hollow seal member is pressed against the outer-cabin side (door side) by means of elasticity for preventing the weather strip from straying. In this structure, when high pressure water 700 splashes the hollow seal part from the outer-cabin side, the hollow seal part as well as the installation base member curves or bends and moves toward the inner-cabin side as an opposite side.

Accordingly, high pressure water 700, which splashes the parting portion, may advance straightly in a diagonally frontward direction, directly hit the front side weather strip, enter the inner-cabin side from the space between the front side weather strip and the center pillar and cause water leak.

Therefore, an object of the present invention is to provide the parting seals and the sealing structures of the parting portions, capable of controlling water leak by high pressure water which splashes the parting portions, even in case the distance is long between the doors and the body panels.

SUMMARY

In order to achieve the above-mentioned object, according to one aspect of the invention, a parting seal (50) is provided, the parting seal (50) including: an assembly part (51); and a seal part (52); the assembly part (51) being assembled on a rear door (1), the seal part (52) being integrally molded with the assembly part (51), the seal part (52) closing a parting portion between a rear end of a front door (2) and a front end of the rear door (1), wherein:

the seal part (52) is hollow, the seal part (52) including a first hollow wall (521) and a second hollow wall (522), the first hollow wall (521) extending toward the front door (2) from the assembly part (51) and facing the parting portion, the second hollow wall (522) extending toward the front door (2) from the assembly part (51) and facing a body panel (4);

a lip (53) is formed on a position, which is on a side of the front door (2) and on which the first hollow wall (521) and the second hollow wall (522) make contact with each other, the lip (53) protruding toward an outer-cabin side;

the first hollow wall (521) is made of sponge material, the second hollow wall (522) and the assembly part (51) are made of solid (dense) material;

the assembly part (51) is free of a core, and the assembly part (51) is immovably assembled on the rear door (1).

In addition, according to an aspect of the present invention, the second hollow wall (522) is substantially linear in cross section and extends toward the front door (2) from the assembly part (51), the first hollow wall (521) is curved toward the outer-cabin side, and a thickness (521T) of the first hollow wall (521) is thinner than a thickness (522T) of the second hollow wall (522).

In addition, according to an aspect of the present invention, the assembly part (51) is forked into a first assembly wall (511) on the outer-cabin side and a second assembly wall (512) on an inner-cabin ride for sandwiching the front end of the rear door (1), the second assembly wall (512) thickens toward the inner-cabin side, and a thickness (512T) of the second assembly wall (512) in a width direction of an automobile is thicker than the thickness (522T) of the second hollow wall (522).

In addition, according to one aspect of the invention, a sealing structure of a parting portion is provided, for closing the parting portion between a rear end of a front door (2) and a front end of a rear door (1) by a seal part (52), the seal part (52) being integrally molded with an assembly part (51), the assembly part (51) being assembled on the rear door (1), wherein:

the seal part (52) is hollow, the seal part (52) including a first hollow wall (521) and a second hollow wall (522), the first hollow wall (521) extending toward the front door (2) from the assembly part (51) and facing the parting portion, the second hollow wall (522) extending toward the front door (2) from the assembly part (51) and facing a body panel (4);

a lip (53) is formed on a position, which is on a side of the front door (2) and on which the first hollow wall (521) and the second hollow wall (522) make contact with each other, the lip (53) protruding toward an outer-cabin side;

the first hollow wall (521) is made of sponge material, the second hollow wall (522) and the assembly part (51) are made of solid (dense) material;

the assembly part (51) is free of a core, the assembly part (51) is immovably assembled on the rear door (1); and when high pressure water (700) splashes the seal part (52) while spraying water for washing an automobile for example, the first hollow wall (521) is widely bent toward the second hollow wall (522) and the assembly part (51).

In addition, according to an aspect of the present invention, the assembly part (51) is forked into a first assembly wall (511) on the outer-cabin side and a second assembly wall (512) on an inner-cabin side for sandwiching the front end of the rear door (1), and a garnish (57) is provided on an outer-cabin side of the rear door (1) for fixing the first assembly wall (511) between the rear door (1) and the garnish (57).

In addition, according to an aspect of the present invention, when high pressure water (700) splashes the seal part (52), the seal part (52) is ineffective in making elastic contact with the body panel (4) of the automobile.

Symbols in parentheses show constituents or items corresponding to the drawings. In the specification, the words "front", "rear", "upper" and "lower", which are related with directions indicate "front", "rear", "upper" and "lower" directions in the automobile.

According to the present invention, the assembly part, which is integrally molded with the seal part, is free of the core and assembled on the rear door. The seal part closes the parting portion between the rear end of the front door and the front end of the rear door. The absence of the core in the assembly part reduces weight and lowers cost.

In addition, the seal part is hollow, including the first hollow wall on the outer-cabin side and the second hollow wall on the inner-cabin side, and the assembly part is immovably assembled on the rear door. The first hollow wall, made of the sponge material, is widely bent toward the second hollow wall and the assembly part when high pressure water splashes the seal part while spraying water for washing the automobile for example. Under the same condition that high pressure water splashes the seal part: the assembly part, made of the solid (dense) material, is immovable; and the second hollow wall, made of the solid (dense) material, slightly bends. High pressure water, which splashes the parting portion from the outer-cabin side, straightly advances toward the body panel including a center pillar through the parting portion. In other words, high pressure water advances in a direction perpendicular to an outer-cabin side surface of the center pillar. As high pressure water hits the first hollow wall of the seal part, a direction of high pressure water is forcibly re-directed at an angle and advances frontward along an outer-cabin side surface of the first hollow wall.

In addition, the lip is formed on the position, which is on the side of the front door and on which the first hollow wall and the second hollow wall make contact with each other. Also, the lip protrudes toward the outer-cabin side. With the formation of the lip, the direction of high pressure water, which is directed along the outer-cabin side surface of the first hollow wall, is forcibly re-directed at the angle and advances toward the outer-cabin side along the outer-cabin side surface of the lip.

This configuration prevents high pressure water from directly hitting a front side weather strip and entering the inner-cabin side from the space between the front side weather strip and the center pillar. Since high pressure water does not enter the inner-cabin side, water does not leak.

The assembly part is immovably assembled on the rear door and made of the solid (dense) material in the same manner as the second hollow wall. Accordingly, the seal part does not make elastic contact with the body panel such as the center pillar as in the prior arts (Japanese unexamined Patent Publication No. 2014-177266, Japanese unexamined Patent Publication No. H05-270261). In addition, the assembly part and the second hollow wall, which do not flutter widely in the outer and inner cabin side direction as in the prior art (Japanese examined Patent Publication No. 4490159), stabilize a direction of high pressure water and fix a direction in which the lip protrudes.

In addition, the first hollow wall, which is curved toward the outer-cabin side, sufficiently deals with deviation of the parting portions as compared with the seal lips having substantially tongue-shaped cross sections as in the prior art as well as closes the parting portion from the inner-cabin side and prevents entrance of air and resultant noise caused by the air. The first hollow wall also improves appearance. The second hollow wall, which is substantially linear in cross section and which extends toward the front door from the assembly part, substantially linearly directs high pressure water to the lip when the first hollow wall bends as well as enables the first hollow wall to be widely curved toward the outer-cabin side. Also, the thickness of the first hollow wall is thinner than the thickness of the second hollow wall. With this configuration, when high pressure water splashes the first hollow wall, only the first hollow wall is positively bent.

In addition, the assembly part is forked into the first assembly wall on the outer-cabin side and the second assembly wall on the inner-cabin side for sandwiching the front end of the rear door, the second assembly wall thickens toward the inner-cabin side, and the thickness of the second assembly wall in the width direction of the automobile is thicker than the thickness of the second hollow wall. With this configuration, the assembly part is immovably assembled on the rear door more firmly.

In addition, the garnish may be provided on the outer-cabin side of the rear door for fixing the first assembly wall between the rear door and the garnish. With this configuration, the assembly part is immovably assembled on the rear door more firmly. If the garnish sufficiently fixes the assembly part on the rear door, thickening the second assembly wall toward the inner-cabin side may be omitted.

In the present invention, when high pressure water splashes the seal part, the seal part does not make elastic contact with the body of the automobile. Accordingly, the present invention is most effective in the configuration of the automobiles that the distance is long between the surface of doors (rear doors, front doors) and the surface of the body panels such as the center pillars.

DESCRIPTION OF PREFERRED EMBODIMENT

Referring to FIG. 1 to FIG. 4 and FIG. 6, a sealing structure according to an embodiment of the present invention of a parting portion will be described.

Figures 1, 2:
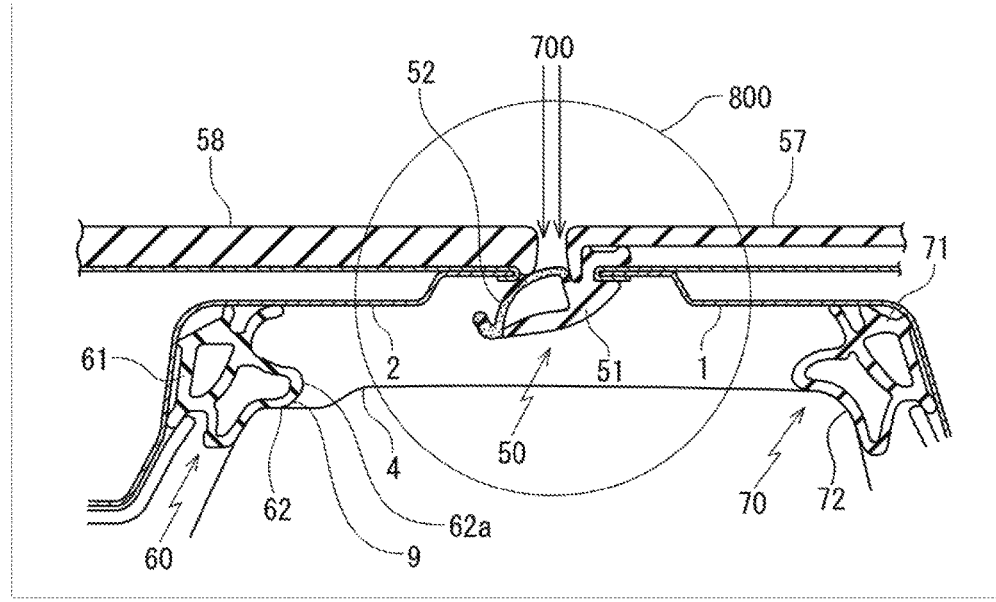
FIG. 1 is an I-I line enlarged cross section of FIG. 6, illustrating a sealing structure according to an embodiment of the present invention of a parting portion.
FIG. 2 is an enlarged cross section of a parting seal shown in FIG. 1.

FIG. 1 illustrates the sealing structure according to the embodiment of the present invention of the parting portion. FIG. 1 corresponds to an I-I line enlarged cross section of FIG. 6. When constituents or items correspond to those in prior arts, the same symbols are used.

As illustrated in FIG. 1, the sealing structure of the parting portion is for closing the parting portion between a rear end of a front door 2 and a front end of a rear door 1 by a parting seal 50 from an inner-cabin side. The parting seal 50 includes an assembly part 51 and a seal part 52. The sealing structure of the parting portion is adopted on an automobile with the configuration that a distance is long between a surface of a door (rear door 1, front door 2) and a surface of a center pillar 4.

As illustrated in FIG. 1, when the front door 2 is closed, a hollow seal part 62 of a front side weather strip 60 makes elastic contact with an outer-cabin side on a front side of the center pillar 4. An installation member 61 of the front side weather strip 60 is operatively coupled on a peripheral edge of the front door 2. In the same manner, when the rear door 1 is closed, a hollow seal part 72 of a rear side weather strip 70 makes elastic contact with an outer-cabin side on a rear side of the center pillar 4. An installation member 71 of the rear side weather strip 70 is operatively coupled on a peripheral edge of the rear door 1. As the hollow seal part 62 of the front side weather strip 60 makes elastic contact with the center pillar 4 and bends, a tip 62a on a side of the rear door 1 of the hollow seal part 62 rises toward an outer-cabin side thereby forming a triangular space 9 between the center pillar 4 and the tip 62a of the hollow seal part 62.

The sealing structure according to the embodiment of the present invention of the parting portion prevents high pressure water 700 from splashing the triangular space 9 from the outer-cabin side through the parting portion while spraying water for washing the automobiles or thunderstorm, and entering the inner-cabin side.

The parting seal 50 diverges from an upper part of a front end of a rear side weather strip 70 and extends downward to a position on a belt line.

The assembly part 51 of the parting seal 50 is forked into a first assembly wall 511 on the outer-cabin side and a second assembly wall 512 on the inner-cabin side and sandwiches a hemming-connected front end of the rear door 1.

Figure 3:
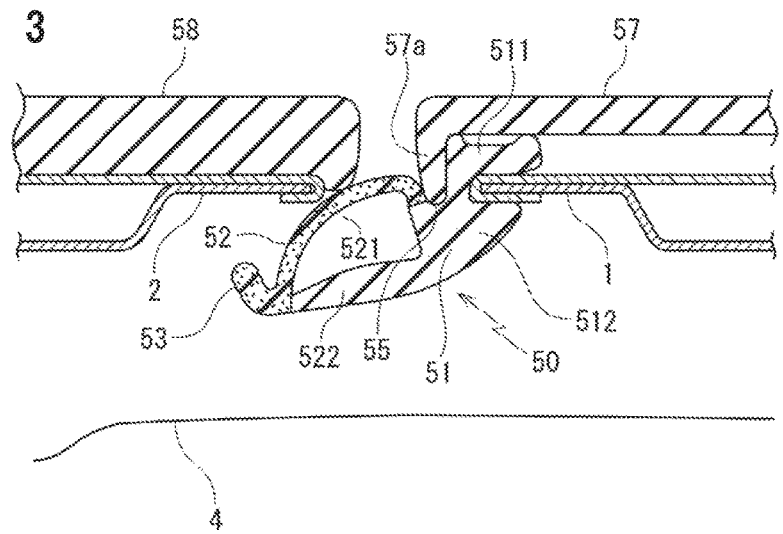
FIG. 3 is an enlarged cross section of a part 800, according to an embodiment of FIG. 1.

The first assembly wall 511 has a substantially L-shaped cross section. As shown in FIG. 2 and FIG. 3, the first assembly wall 511 includes: a short side 511a, which abuts with a top end of the rear door 1; and a long side 511b, which abuts with an outer-cabin side surface of the rear door 1. The long side 511b has: a protrusion 511ba formed on an outer-cabin side on a front side thereof; and a protrusion 511bb formed on the outer-cabin side on a rear side thereof, respectively.

The second assembly wall 512 thickens toward the inner-cabin side as a side of a tip 512a and has a substantially ridge-shaped (triangular-shaped) cross section. The short side 511a of the first assembly wall 511 connects with a substantial center of a base 512b of the second assembly wall 512. The base 512b of the second assembly wall 512, which extends rearward from a position of connection (short side 511a and base 512b), abuts with an inner-cabin side surface of the rear door 1.

The seal part 52 of the parting seal 50 is hollow and includes a first hollow wall 521 and a second hollow wall 522. The first hollow wall 521 extends toward the front door 2 from the assembly part 51 and faces the parting portion (outer-cabin side). The second hollow wall 522 extends toward the front door 2 from the assembly part 51 and faces the center pillar 4 at a back (inner-cabin side) of the parting portion.

The second hollow wall 522 is substantially linear in cross section. The second hollow wall 522 extends in a diagonal direction, which is toward the side of the front door 2 and the inner-cabin side, from the tip 512a of the second assembly wall 512 of the assembly part 51. A thickness at a center of the second hollow wall 522 is thicker than: a thickness on a top end of the second hollow wall 522 as a side of the front door 2; and a thickness on a rear end of the second hollow wall 522 as a side of the rear door 1.

The first hollow wall 521 is curved and protrudes toward the outer-cabin side. A top end of the first hollow wall 521 as the side of the front door 2 connects with the top end of the second hollow wall 522. A rear end of the first hollow wall 521 as the side of the rear door 1 connects with and rises from the top end of the base 512*b* of the second assembly wall 512 of the assembly part 51 toward the outer-cabin side.

A lip 53 is formed on a position, which is on the side of the front door 2 and on which the top end of the first hollow wall 521 and the top end of second hollow wall 522 make contact with each other. The lip 53 protrudes in a diagonal direction, which is toward the side of the front door 2 and the outer-cabin side. A width 53T of the lip 53 is thicker than a thickness 521T of the first hollow wall 521. The lip 53 protrudes by a length 53L, which is substantially half a curvature 521S of the first hollow wall 521 from an inner-cabin side surface of the top end of the second hollow wall 522.

A thickness 521T of the first hollow wall 521, which is thinner than a thickness 522T of the second hollow wall 522, is easier to bend. A thickness 512T of a second assembly wall 512 in a width direction of an automobile is thicker than a thickness 522T of the second hollow wall 522. Length 512*b*L of the base 512*b* of the second assembly wall 512 is shorter than length 522L of the second hollow wall 522 in cross section.

The assembly part 51 is firmly assembled on the rear door 1. Specifically, the assembly part 51, which is free of a core, is immovable and does not bend while sandwiching the front end of the rear door 1 with the first assembly wall 511 and the second assembly wall 512.

In addition, a garnish 57 is provided on an outer-cabin side of the rear door 1 and a garnish 58 is provided on an outer-cabin side of the front door 2. The garnish 57 on the side of the rear door 1, together with the rear door 1, fixes the first assembly wall 511 of the assembly part 51. More specifically, the assembly part 51 is firmly assembled on the rear door 1 by: inserting a pressing piece 57*a* of the garnish 57 in a concave 55; and pressing an inner-cabin side surface of the garnish 57 against the protrusions 511*ba* and 511*bb* on the first assembly wall 511. The pressing piece 57*a*, which is a part of the garnish 57 on a side of the front door 2, is bent toward the inner-cabin side. The concave 55 is formed between the first hollow wall 521 of the seal part 52 and the first assembly wall 511 of the assembly part 51.

The first hollow wall 521 and the lip 53 are made of sponge rubber material. The second hollow wall 522 and the assembly part 51 are made of solid (dense) rubber material. Resin materials, thermoplastic elastomer for example, can substitute for the rubber materials.

In the sealing structure according to the embodiment the present invention of the parting portion, the assembly part 51, which is integrally molded with the seal part 52, is free of the core and assembled on the rear door 1. The seal part 52 closes the parting portion between the rear end of the front door 2 and the front end of the rear door 1. The absence of the core in the assembly part 51 reduces weight and lowers cost.

Figure 4:
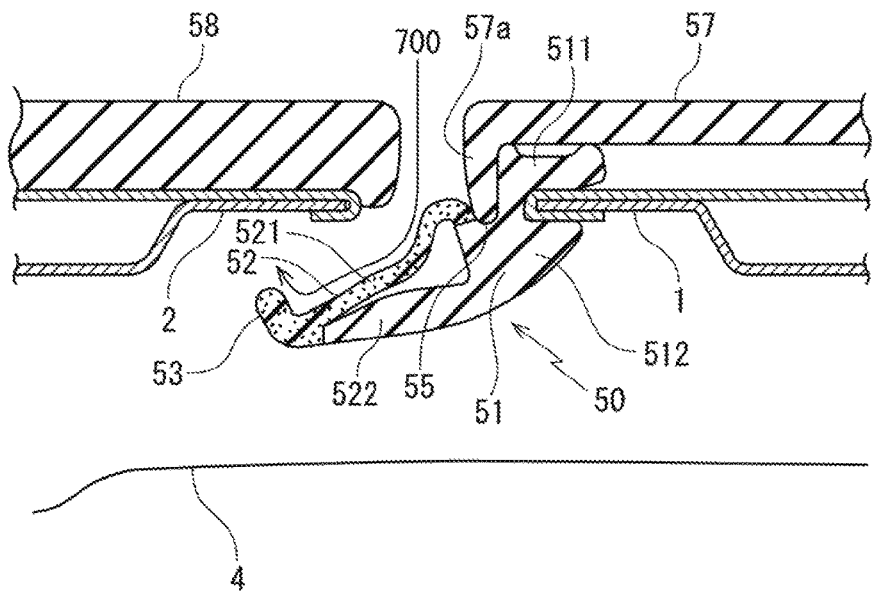
FIG. 4 is an enlarged cross section of the parting seal shown in FIG. 3 with high pressure water splashing the parting seal.

In addition, the seal part 52 is hollow, including the first hollow wall 521 on the outer-cabin side and the second hollow wall 522 on the inner-cabin side, and the assembly part 51 is immovably assembled on the rear door 1. As shown in FIG. 4, the first hollow wall 521, made of sponge material, is widely bent toward the second hollow wall 522 and the assembly part 51 when high pressure water 700 splashes the seal part 52 while spraying water for washing the automobile for example. Under the same condition that high pressure water 700 splashes the seal part 52, the assembly part 51, made of solid (dense) material, is immovable; and the second hollow wall 522, made of the solid (dense) material, slightly bends. High pressure water 700, which splashes the parting portion from the outer-cabin side, straightly advances toward a center pillar 4 through the parting portion. In other words, high pressure water 700 advances in a direction perpendicular to an outer-cabin side surface of the center pillar 4. As high pressure water 700 hits the first hollow wall 521 of the seal part 52, a direction of high pressure water 700 is forcibly re-directed at an angle and advances frontward along an outer-cabin side surface of the first hollow wall 521.

In addition, the lip 53 made of the sponge material is formed on the position, which is on the side of the front door 2 and on which the first hollow wall 521 and the second hollow wall 522 make contact with each other. Also, the lip 53 protrudes toward the outer-cabin side. With the formation of the lip 53, the direction of high pressure water 700, which is directed along the outer-cabin side surface of the first hollow wall 521, is forcibly re-directed at an angle and advances toward the outer-cabin side along the outer-cabin side surface of the lip 53.

This configuration prevents high pressure water 700 from directly hitting a front side weather strip 60 and entering the inner-cabin side from the space between the front side weather strip 60 and the center pillar 4. Since high pressure water 700 does not enter the inner-cabin side, water does not leak.

The assembly part 51 is immovably assembled on the rear door 1 and made of the solid (dense) material in the same manner as the second hollow wall 522. Accordingly, the seal part 52 does not make elastic contact with the center pillar 4. In addition, the assembly part 51 and the second hollow wall 522, which do not flutter widely in the outer and inner cabin side direction, stabilize the direction of high pressure water 700 and fix a direction in which the lip 53 protrudes.

In addition, the first hollow wall 521 of the seal part 52, which is curved toward the outer-cabin side, sufficiently deals with deviation of the parting portions as compared with the seal lips having substantially tongue-shaped cross sections as well as closes the parting portion from the inner-cabin side and prevents entrance of air and resultant noise caused by the air. The first hollow wall 521 also improves appearance. The second hollow wall 522, which is substantially linear in cross section and which extends toward the front door from the assembly part 51, directs high pressure water 700 to the lip 53 stably and substantially linearly when the first hollow wall 521 bends as well as enables the first hollow wall 521 to be widely curved toward the outer-cabin side. Also, the thickness 521T of the first hollow wall 521 is thinner than the thickness 522T of the second hollow wall 522. With this configuration, when high pressure water 700 splashes the first hollow wall 521, only the first hollow wall 521 is positively bent.

The seal lip 40 according to the prior art, having the substantially tongue-shaped cross section, has been required to make elastic contact with the center pillar 4 as well as close the parting portion. But, the first hollow wall 521 according to the embodiment of the present invention need not make elastic contact with the center pillar 4 and is only required to close the parting portion. In addition, length and shape of the first hollow wall 521, which is corresponding to the seal lip 40 according to the prior art, does not have a harmful influence on opening and closing the door.

In addition, the assembly part 51 is forked into the first assembly wall 511 on the outer-cabin side and the second assembly wall 512 on the inner-cabin side for sandwiching the front end of the rear door 1, the second assembly wall 512 thickens toward the inner-cabin side, and the thickness 512T in the width direction of the automobile is thicker than the thickness 522T of the second hollow wall 522. With this configuration, the assembly part 51 is immovably assembled on the rear door 1 more firmly.

Figure 5:
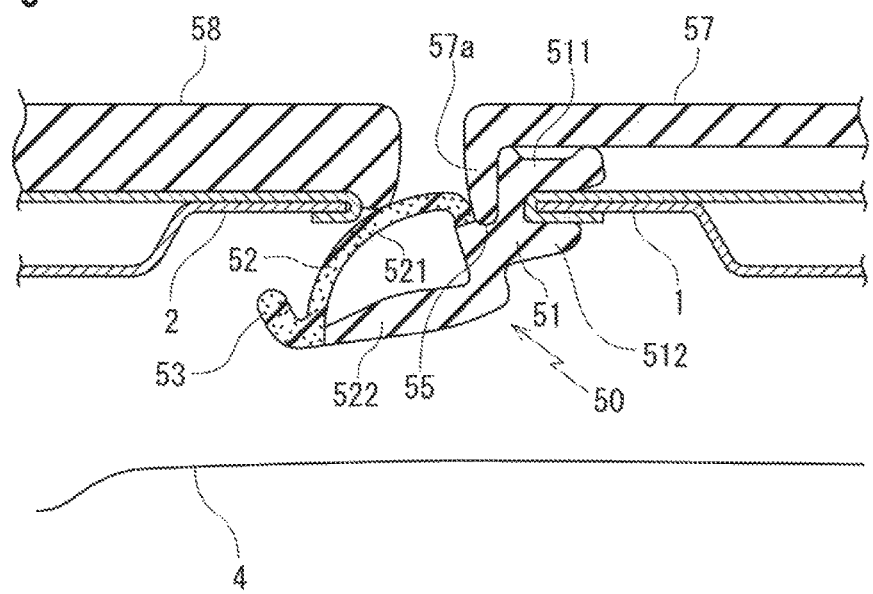
FIG. 5 is an enlarged cross section of the part 800, according to another embodiment of FIG. 1.
Figure 6:
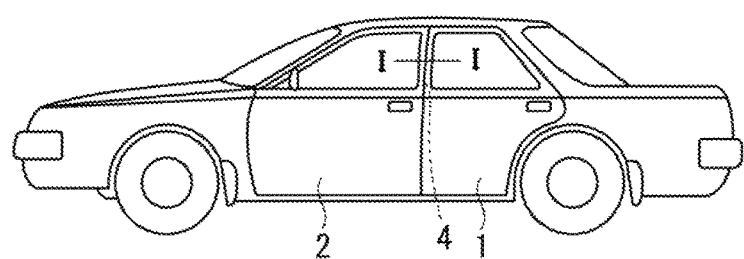
FIG. 6 is a side view of a four-door sedan.
Figure 7:
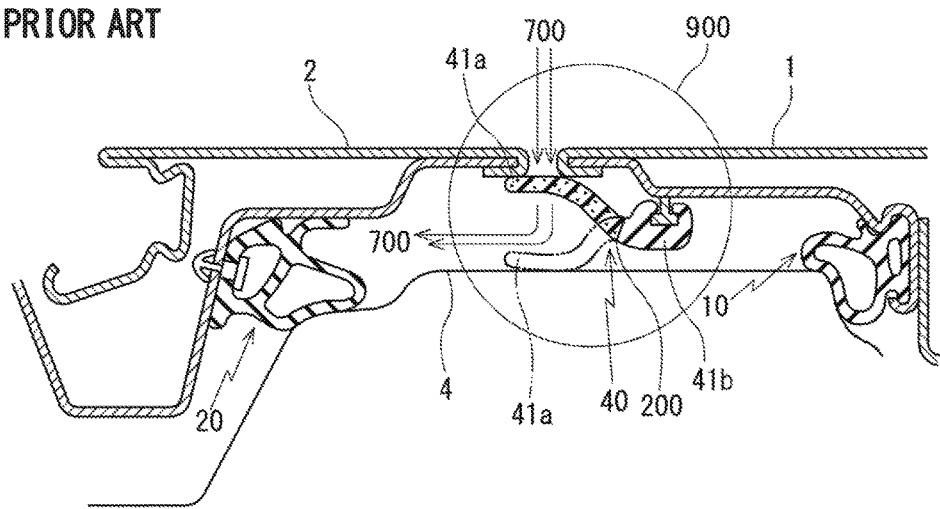
FIG. 7 is an I-I line enlarged cross section of FIG. 6, illustrating a sealing structure according to a prior art of a parting portion.
Figure 8:
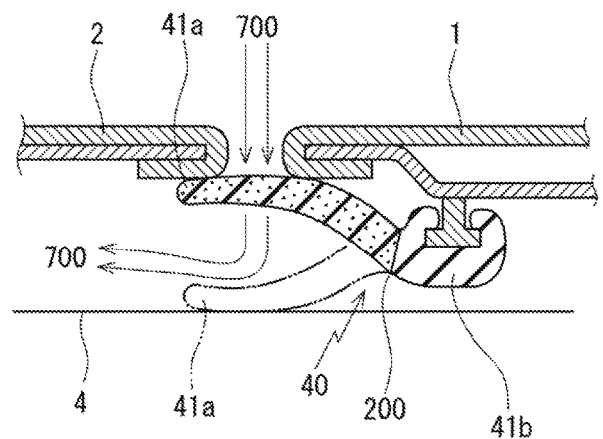
FIG. 8 is an enlarged cross section of a part 900 of FIG. 7.
Figure 9:
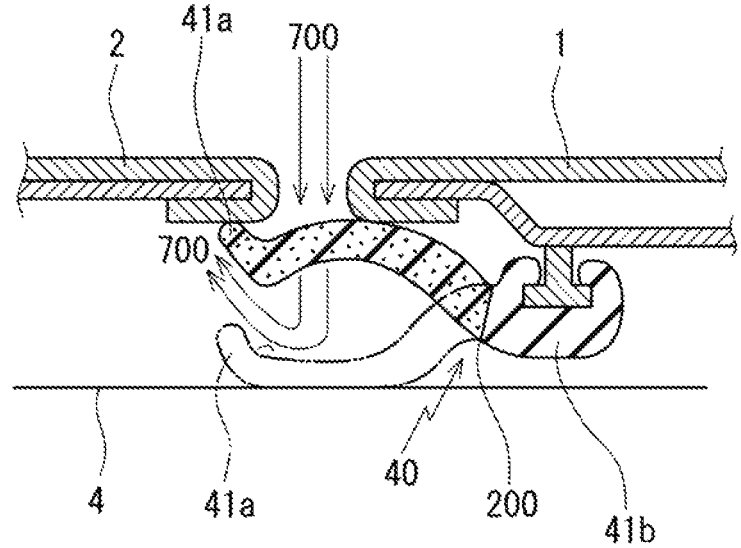
FIG. 9 is an enlarged cross section of the part 900, according to another embodiment of FIG. 7.

The second assembly wall 512, at least, of the assembly part 51 may be made of material higher in rigidity. As shown in FIG. 5, this configuration eliminates the need for thickening the second assembly wall 512 toward the inner-cabin side. The resultant assembly part 51 has a substantially U-shaped cross section.

In the embodiment of the present invention, the lip 53 is made of the sponge material. FIG. 2 and FIG. 5 illustrate that the lip 53 is continuous with the first hollow wall 521. Alternatively, the lip 53 may be made of the solid (dense) material and continuous with the second hollow wall 522 for resisting pressure from high pressure water 700. But, the lip 53, which is continuous with the first hollow wall 521 and made of the sponge material as in the embodiment of the present invention, forms a uniform outer-cabin side surface of the parting seal 50 without a dividing line of the materials and is improved in appearance.

The parting seal 50 according to the embodiment of the present invention diverges from the upper part of the front end of the rear side weather strip 70 and extends downward. In this connection, the parting seal 50 may be unified with the rear side weather strip 70, which is not separable from the rear side weather strip 70, or not unified with the rear side weather strip 70, which is separable from the rear side weather strip 70. Known methods of unifying the parting seal 50 with the rear side weather strip 70 include: thermally fusion-bonding the parting seal 50 with a die-molded upper part of the front end of the rear side weather strip 70 while the upper part of the front end is being die-molded; and using adhesive between the parting seal 50 and the upper part of the front end of the rear side weather strip 70, which may be die-molded or not die-molded. A separable structure, not as the embodiment of the present invention in which the parting seal 50 diverges from the upper part of the front end of the rear side weather strip 70, may include an embodiment that has an obvious opening or space between the parting seal 50 and the rear side weather strip 70.

We claim:

1. A parting seal comprising:
an assembly part configured to be fixed on a rear door of an automobile, the assembly part being free of a core and including a dense material such that the assembly part resists bending; and
a seal part integrally molded with the assembly part, the seal part configured to close a parting portion between a rear end of a front door of the automobile and a front end of the rear door of the automobile, the seal part being hollow and having an outer-cabin side facing the parting portion and an inner-cabin side opposite the outer-cabin side, the seal part comprising:
a first wall extending from the assembly part toward the front door, the first wall on the outer-cabin side of the parting seal facing the parting portion, the first wall being curved, the first wall including a sponge material, the first wall having a first thickness defined between an outer-cabin surface and an inner-cabin surface of the first wall;
a second wall extending from the assembly part toward the front door on the inner-cabin side of the parting seal, the second wall being substantially linear in cross section taken perpendicular to a longitudinal direction of the parting seal and including the dense material, the second wall having a second thickness defined between an outer-cabin surface and an inner-cabin surface of the second wall, the first thickness of the first wall being less than the second thickness of the second wall, the second thickness varying along a length of the second wall such that the second thickness at a center of the second wall is greater than the second thickness of at least one other part of the second wall; and
a lip formed where the first wall and the second wall make contact with each other, the lip protruding toward the outer-cabin side of the parting seal.

2. The parting seal as claimed in claim 1, wherein at least one of the first wall or the second wall is hollow.

3. The parting seal as claimed in claim 1, wherein the assembly part includes a first assembly wall on the outer-cabin side of the parting seal and a second assembly wall on the inner-cabin side of the parting seal, the first and second assembly walls configured to sandwich the front end of the rear door therebetween, the second assembly wall increases in thickness toward the inner-cabin side as the second assembly wall extends toward the front door, and a thickness of the second assembly wall in a direction from the outer-cabin side to the inner-cabin side of the parting seal is thicker than the second thickness of the second wall.

4. A sealing structure of a parting portion configured to close the parting portion between a rear end of a front door and a front end of a rear door of an automobile, the sealing structure comprising:
an assembly part configured to be fixed on the rear door of the automobile, the assembly part being free of a core and including a dense material;
a seal part integrally molded with the assembly part, the seal part being hollow and including a first wall and a second wall, the first wall extending from the assembly part toward the front door on an outer-cabin side of the sealing structure facing the parting portion, the second wall extending from the assembly part toward the front door on an inner-cabin side of the sealing structure opposite the outer-cabin side, the first wall including a sponge material and the second wall including the dense material, the first wall configured to bend toward the second wall and the assembly part in response to high pressure water contacting the seal part, the first wall having a first thickness defined between an outer-cabin surface and an inner-cabin surface of the first wall, the second wall being substantially linear in cross section taken perpendicular to a longitudinal direction of the parting seal, the second wall having a second thickness defined between an outer-cabin surface and an inner-cabin surface of the second wall, the first thickness of the first wall being less than the second thickness of the second wall, the second thickness varying along a length of the second wall such that the second thickness at a center of the second wall is greater than the second thickness of at least one other part of the second wall; and a lip is formed where the first wall and the second wall make contact with each other, the lip protruding toward the outer-cabin side.

5. The sealing structure as claimed in claim 4, wherein the assembly part includes a first assembly wall on the outer-cabin side of the sealing structure and a second assembly wall on an inner-cabin side, the first and second assembly walls configured to sandwich the front end of the rear door.

6. The sealing structure as claimed in claim 5, wherein the second wall is configured to prevent the seal part from contacting a body panel of an automobile in response to high pressure water contacting the seal part.

7. The sealing structure as claimed in claim 5, further comprising a garnish on the outer-cabin side of the first assembly wall, the garnish configured to fix the first assembly wall between the rear door and the garnish.

8. The sealing structure as claimed in claim 7, wherein the garnish is configured to be positioned on the outer-cabin side of the rear door.

9. The sealing structure as claimed in claim 4, wherein at least one of the first wall or the second wall is hollow.

10. The sealing structure as claimed in claim 4, wherein the second wall is configured to prevent the seal part from contacting a body panel of an automobile in response to high pressure water contacting the seal part.

11. A parting seal comprising:
an assembly part configured to be fixed to a rear door of an automobile; and
a seal part integrally molded with the assembly part, the seal part including:
a first wall on an outer-cabin side of the parting seal and extending from the assembly part toward a front door of the automobile;
a second wall on an inner-cabin side of the parting seal opposite the outer-cabin side and extending from the assembly part toward the front door in a substantially linear manner, the second wall having a thickness defined between an outer-cabin surface and an inner-cabin surface of the second wall, the thickness of the second wall varying along a length of the second wall such that the thickness at a center of the second wall is greater than the thickness of at least another portion of the second wall; and
a lip formed where the first wall and the second hollow join one another, the lip protruding toward the outer-cabin side of the parting seal.

12. The parting seal as claimed in claim 11, wherein the assembly part is configured to resist bending.

13. The parting seal as claimed in claim 12, wherein the assembly part is free of a core and including a dense material such that the assembly part resists bending.

* * * * *